3,050,547
1-2 RING CLEAVAGE OF 2-CYANOCYCLO-
ALKANONES
Rolland M. Waters, Freeport, and John M. Lee, Lake
Jackson, Tex., assignors to The Dow Chemical Company, Midland, Mich., a corporation of Delaware
No Drawing. Filed July 2, 1959, Ser. No. 824,476
6 Claims. (Cl. 260—465.4)

This invention relates to a new method of effecting a 1-2 ring cleavage of 2-cyanocycloalkanones and more particularly it concerns a method for the production of cyano monocarboxylic acid salts.

Generally the method of the present invention may be represented by the formulae:

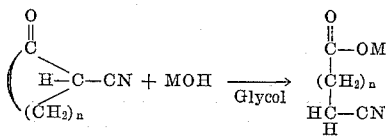

wherein M represents an alkali metal and $n$ is an integer from 3 to 15.

A cursory examination of the particular starting materials and the products to be made from them by means of this invention does not fully reveal the importance of effecting a direct ring cleavage of 2-cyanocycloalkanones. To gain a proper perspective, it is necessary to view this invention against a larger complex of chemistry wherein the object is to start with a cycloalkanone and, through a series of intermediate chemical reactions, produce a difunctional cyano monocarboxylic acid or its salt with the cyano and monocarboxylic acid groups at opposite ends of the molecule.

A method of producing such compounds is shown in the combined references of volume 66, Journal of American Chemical Society, page 839 (1943), and volume 69, Journal of American Chemical Society, pages 1056–7 (1947). Basically, this method comprises oxidizing a cycloalkanone with such an agent as hydrogen peroxide or persulfate to produce a lactone. This lactone, when reacted with a halo acid in the presence of sulfuric acid, results in the corresponding halomonocarboxylic acid with the halogen at the opposite end of the alkyl chain from the carboxyl group. The cyano group is then added to the molecule by a substitution reaction with a reagent such as sodium cyanide.

The present invention permits the use of an entirely different series of reactions. Again starting with a cycloalkanone, the starting material for the present invention, a 2-cyanocycloalkanone, may be produced by the conventional reactions of halogenating the cycloalkanone to make the corresponding 2-halocycloalkanone, and then substituting a cyano group for the halogen by means of a reaction with a cyanide ion containing reagent such as sodium cyanide. Other methods that may be employed to produce 2-cyanocycloalkanones include those shown in Chemical Abstracts, volume 31, page 1820. Once the 2-cyanocycloalkanone is prepared, the present invention becomes applicable. Previously known methods of effecting a 1-2 ring cleavage of 2-cyanocycloalkanones would also have a hydrolyzing effect on the nitrile group resulting in the production of a dicarboxylic acid or possibly a hydroxy monocarboxylic acid instead of the desired cyano monocarboxylic acid. This invention, however, unexpectedly achieves a direct cleavage of the 2-cyanocycloalkanone without hydrolysis of the nitrile by means of a reaction with an alkali metal caustic in a glycolic medium. The 1-2 cleavage reaction which is a critical function of time and temperature occurs between the alkali metal caustic and the ketonic ring member of the 2-cyanocycloalkanone. The resulting product mixture contains the alkali metal salt of a cyano monocarboxylic acid having the cyano and carboxylate groups at opposite ends of the molecule. A mineral acid such as HCl may be employed, if desired, to acidify the salt producing thereby the corresponding acid.

Thus, it may be seen from a comparison of the foregoing methods for producing cyano monocarboxylic acids with the functional groups at opposite ends of the alkyl chain that this invention permits a truly distinct approach to the method of their production. It has the advantages of being easily and safely carried out, without the use of highly unstable and erratic reactants such as hydrogen peroxide or persulfate.

The reactants and other necessary materials for carrying out this invention are described below. Quantities where necessary are described on the basis of the molar ratio of the moles of the ingredient to a mole unit of the nitrile group.

The caustic reactant can be any of the alkali metal hydroxides such as sodium hydroxide, potassium hydroxide or lithium hydroxide with a preferred caustic being sodium hydroxide. An operable range of caustic is from a caustic/nitrile molar ratio of 1:1 to 4:1 with a preferred ratio of about 2:1.

The other essential reactant, 2-cyanocycloalkanone, may be prepared by conventional methods from a cycloalkanone. Illustratively, one method involves actinic chlorination of a cycloalkanone to produce the corresponding 2-chlorocycloalkanone and reacting this product with sodium cyanide in the presence of $Na_2CO_3$, to substitute a cyano group for the chlorine atom. 2-cyanocycloalkanones operable within this invention are those having from 5 to 17 ring carbon atoms.

An essential non-reacting component necessary for carrying out this invention is the glycolic medium in which the reaction is carried out. The glycols that are operable may be of the ethylene, propylene or butylene glycol series having a maximum viscosity of 8 centistokes at 200° F. or within a range of 15 to 120 centistokes at 77° F. Examples of glycols that may be employed include ethylene, diethylene, triethylene, tetraethylene, pentaethylene, hexaethylene, heptaethylene, octaethylene, nonaethylene, decaethylene, propylene, dipropylene, tripropylene, tetrapropylene, pentapropylene, hexapropylene, heptapropylene, octapropylene, butylene, dibutylene, tributylene, tetrabutylene, pentabutylene, hexabutylene, heptabutylene, octabutylene and the like glycols.

In carrying out the reaction of the invention, the reactants are brought into contact within a heated glycolic medium. They are maintained in this condition for periods of time from about 4 to 120 minutes but within this range there is a more limited range at which optimum results are achieved, particularly a range of about 6 to 12 minutes. The reaction may be carried out at a temperature within the range of 160° to 220° C. but a range of about 180° to 210° C. is preferred. A desirable temperature is 200° C. If the upper limits of the above temperature conditions are passed, the time of conversion from 2-cyanocycloalkanone to cyano monocarboxylic acid salts will decrease, but the quantities of dicarboxylic acids arising from the hydrolysis of the nitrile group will vastly increase. At lower temperatures, the amount of dicarboxylic acid formed will decrease but the time of conversion increases greatly.

A preferred embodiment of this invention involves the conversion of 2-cyanohexanone to sodium 6-cyanohexanoate which is easily acidified in the presence of an acid such as HCl to produce 6-cyanohexanoic acid. The reaction consists of contacting 2-cyanohexanone with sodium hydroxide in the presence of tetraethylene glycol at 200° C. for a period of about 6 or 7 minutes producing thereby sodium 6-cyanohexanoate which can be acidified, if desired, and separated from the reaction mixture. Acidification is accomplished by adding one of the mineral acids, preferably HCl, to the reaction mixture until it has a pH of about 1. Other acids such as sulfuric, nitric, and the like acids may be also employed.

The following examples should not be construed as limitations in the scope of this invention but merely as illustrations of the same.

Example 1

A reaction vessel which consisted of a ½ liter 3-necked, round-bottom flask was equipped with a magnetic stirrer, gas inlet, thermocouple, Glas-Col heater, reflux condenser having a calcium sulfate drier on its outlet, addition funnel and a suction dump tube leading to 200 grams of ground ice in a metal beaker which was cooled with Dry Ice in acetone. In this reaction vessel was placed 200 milliliters of tetraethylene glycol and 8.4 grams (0.2 mole) of sodium hydroxide pellets. Stirring was started and a nitrogen purge was begun. The reaction vessel temperature was adjusted at 200° C. and maintained at that temperature by a thermocouple and associated circuits. At this juncture, the system was ready for the addition of 2-cyanocyclohexanone of which 11.6 grams (0.096 mole) was added. After 6 minutes of heating and stirring, the reaction mass containing sodium 6-cyanohexanoate was removed by means of the suction dump tube into the crushed ice to quench the reaction. After acidification of the mixture with HCl to a pH of 1, the solution was extracted with five 200-milliliter portions of ethyl ether which was dried with sodium sulfate and distilled to yield 6.4 grams (45 percent based on starting material of 2-cyanocycloalkanone) of 6-cyanohexanoic acid boiling from 158° to 160° C. at 1.5–2.0 mm. Hg.

In a manner similar to that of the foregoing example, the 1–2 cleavage of 2-cyanocycloalkanone may be achieved in a glycolic medium by substituting for sodium hydroxide other caustics such as potassium hydroxide and lithium hydroxide achieving thereby comparable results.

Also, similar results are obtained by the substitution for the 2-cyanocyclohexanone of the foregoing example of such other materials as 2-cyanocyclopentanone, 2-cyanocyclooctanone, 2-cyanocyclodecanone, 2-cyanocyclododecanone, 2-cyanocyclotetradecanone and 2-cyanocycloheptadecanone which result in the production of the alkali metal salts of 5-cyanovaleric acid, 8-cyanooctanoic acid, 10-cyanodecanoic acid, 12-cyanododecanoic acid, 14-cyanotetradecanoic acid and 17-cyanoheptadecanoic acid, respectively.

Various modifications may be made in carrying out this invention without departing from the scope thereof and it should be understood that we limit ourselves only as defined in the following claims as read in the light of the specification.

We claim:
1. A method for producing compounds having the formula

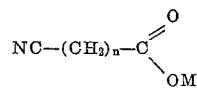

wherein M is an alkali metal and $n$ is an integer from 4 to 16 comprising reacting a 2-cyanocyclo-alkanone having the formula

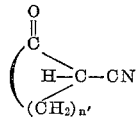

wherein $n'$ is an integer from 3 to 15, with an alkali metal hydroxide in a glycolic medium at a temperature from about 160° to about 220° C. and separating the desired product from the reaction mixture, said reactants being employed in the relative proportions of from 1 to 4 moles of the alkali metal hydroxide for each mole of the 2-cyanocycloalkanone and said glycolic medium consisting of glycols and having a viscosity not exceeding 8 centistokes at 200° F.

2. A process as in claim 1 wherein the reactants are contacted in the glycolic medium for a period of time from about 4 to about 120 minutes.

3. A process as in claim 1 wherein the reactants are contacted in the glycolic medium for a period of time from about 6 to about 12 minutes.

4. A process as in claim 1 where the reaction temperature employed is from about 180 to about 210° C. and the reactants are contacted in the glycolic medium for a period of time from about 6 to about 12 minutes.

5. A method for producing an alkali metal salt of 6-cyanohexanoic acid comprising reacting 2-cyanocyclohexanone with an alkali metal hydroxide in a glycolic medium at a temperature from about 160° to about 220° C. and separating the desired product from the reaction mixture, said reactants being employed in the relative proportions of from 1 to 4 moles of the alkali metal hydroxide for each mole of the 2-cyanocyclohexanone and said glycolic medium consisting of glycols and having a viscosity not exceeding 8 centistokes at 200° F.

6. A method for producing sodium 6-cyanohexanoate comprising reacting 2-cyanocyclohexanone with sodium hydroxide in the presence of a glycolic medium at a temperature from about 160° to 220° C. and separating the desired product from the reaction mixture, said reactants being employed in the relative proportions of from 1 to 4 moles of the sodium hydroxide for each mole of the 2-cyanocyclohexanone and said glycolic medium consisting of glycols and having a viscosity not exceeding 8 centistokes at 200° F.

References Cited in the file of this patent

UNITED STATES PATENTS 2,710,302    Hyson _____ June 7, 1955

OTHER REFERENCES

Lamant: Comptes Rendus, vol. 26, June 29, 1959, pages 3714–3716. (Copy of above in Sci. Lib.)